United States Patent
Yao et al.

(10) Patent No.: US 12,542,162 B1
(45) Date of Patent: Feb. 3, 2026

(54) CRASH STOP THAT INCLUDES SILICONE RUBBER FOR A DATA STORAGE DEVICE, AND RELATED ARTICLES, SYSTEMS, AND METHODS

(71) Applicant: Seagate Technology LLC, Fremont, CA (US)

(72) Inventors: Michael Yi Zhao Yao, Singapore (SG); Lihong Zhang, Singapore (SG); Chee Yin Chan, Singapore (SG); Daniel R. Stevens, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/805,789

(22) Filed: Aug. 15, 2024

(51) Int. Cl.
G11B 33/14 (2006.01)
G11B 33/02 (2006.01)

(52) U.S. Cl.
CPC .......... *G11B 33/14* (2013.01); *G11B 33/027* (2013.01); *G11B 2220/2516* (2013.01)

(58) Field of Classification Search
None
See application file for complete search history.

(56) References Cited

U.S. PATENT DOCUMENTS

| | | |
|---|---|---|
| 5,365,389 A | 11/1994 | Jabbari et al. |
| 5,448,436 A | 9/1995 | Albrecht |
| 6,134,086 A | 10/2000 | Kim |
| 6,274,648 B1 * | 8/2001 | Meguriya .................. C08J 9/32 524/588 |
| 6,480,361 B1 | 11/2002 | Patterson |
| 7,420,771 B1 | 9/2008 | Hanke et al. |
| 7,605,999 B1 | 10/2009 | Kung et al. |
| 8,038,832 B2 | 10/2011 | Tanaka |
| 9,481,817 B2 | 11/2016 | Pichl et al. |
| 9,489,987 B1 | 11/2016 | Oveyssi |
| 9,704,521 B1 | 7/2017 | Shah et al. |
| 10,381,049 B2 | 8/2019 | Zhang et al. |
| 10,803,891 B1 | 10/2020 | Jacoby et al. |
| 11,198,798 B2 | 12/2021 | Natale et al. |
| 11,276,436 B1 | 3/2022 | Zhang et al. |
| 11,567,834 B2 | 1/2023 | Bent et al. |
| 2007/0161732 A1 | 7/2007 | Hasegawa et al. |
| 2008/0249244 A1 * | 10/2008 | Meguriya ............... C08L 83/04 525/100 |
| 2011/0141619 A1 | 6/2011 | Chan et al. |
| 2014/0024730 A1 * | 1/2014 | Shimakawa ............. C08K 3/36 521/154 |
| 2016/0351217 A1 * | 12/2016 | Armstrong ............. G11B 21/12 |
| 2020/0270651 A1 | 8/2020 | Jeffries et al. |

(Continued)

OTHER PUBLICATIONS

Guo et al., "Flyability Failures Due to Siloxanes at the Head-Disk Interface Revisited," IEEE Transactions on Magnetics, vol. 43, No. 6, Jun. 2007, (3 pages).

(Continued)

Primary Examiner — William J Klimowicz
(74) Attorney, Agent, or Firm — Kagan Binder, PLLC

(57) ABSTRACT

Data storage devices that include one or more crash stops that include cured, silicone rubber. Related articles (e.g., shock-absorbing member) that include cured, silicone rubber for crash stops and methods of making shock-absorbing members that include cured, silicone rubber.

15 Claims, 7 Drawing Sheets

(56) References Cited

U.S. PATENT DOCUMENTS

2022/0270651 A1  8/2022  Arai et al.

OTHER PUBLICATIONS

"ESCA Testing Reveals Silicone Contamination on an Adhesive That Could Compromise Hard Drive," Innovatech Labs, LLC, retrieved from 'https://www.innovatechlabs.com/silicone-contamination-hard-drive-adhesive/', retrieved on Jul. 15, 2024 (7 pages).

Idema Standards, "Effects of Contamination in Disk Drives," Document No. M3-98, retrieved from 'https://www.google.com/url?sa=t&source=web&rct=j&opi=89978449&url=https://idema.org/wp-content/downloads/1069.pdf&ved=2ahUKEwjGtLCHm_WHAxW4rYkEHTr-LUcQFnoECBwQAQ&usg=AOvVaw09QCJ9bn2edU7yo8M7fGjv', retrieved on Aug. 14, 2024, IDEMA All Rights Reserved, (4 pages).

Kasai et al., "Silicon Oxide Formation in the Disk Environment," J. Info. Storage Proc. Syst., vol. 2, pp. 125-128, 2000, (5 pages).

"Hard Disk Drive," MPCT, Mektec Precision Component (Thailand) Ltd., MPCT Inc., retrieved from 'https://www.mpct.mektec.co.th/Product,' retrieved on Aug. 14, 2024 (2 pages).

"O-Ring Materials," Ace Seal, Ace Seal & Rubber, retrieved from 'https://www.aceseal.com/o-ring-materials,' retrieved on Aug. 14, 2024 (6 pages).

"Per- and polyfluoroalkyl substances," Wikipedia, The Free Encyclopedia, retrieved from 'https://en.wikipedia.org/wiki/Per-_and_polyfluoroalkyl_substances,' last edited Aug. 14, 2024, (44 pages).

"Platinum Cured Silicone: How Platinum Curing Expands the Use of Silicone Rubbers," HM Royal Materials Distribution, Jul. 27, 2023, retrieved from 'https://hmroyal.com/blog/platinum-cured-silicone-how-platinum-curing-expands-the-use-of-silicone-rubbers/', (6 pages).

"Polydimethylsiloxane," Wikipedia, The Free Encyclopedia, retrieved from 'https://en.wikipedia.org/w/index.php?title=Polydimethylsiloxane&oldid=1225856508', last edited May 27, 2024, (12 pages).

"Precision Component For 'HDD'," retrieved from 'https://www.mektron.co.jp/product_e/hdd_e/,' retrieved on Apr. 12, 2024, (3 pages).

"Silicone O-Rings, Seals & Gaskets," ACE Seal, Ace Seal & Rubber, retrieved from 'https://www.aceseal.com/silicone-o-rings-gaskets-seals,' retrieved on Jul. 15, 2024 (5 pages).

Jan van K, "Silicone Rubber: Complete Guide on Highly Durable Elastomer," Omnexus, The Material Selection Platform, Jul. 25, 2021, (17 pages).

Chandrasekaran, "Manufacture of Seals and 'O' Rings," Rubber Seals for Fluid and Hydraulic Systems, Chapter 10, pp. 99-124, 2010, (26 pages).

Fujisawa et al., "Relationships Between Base-Catalyzed Hydrolysis Rates or Glutathione Reactivity for Acrylates and Methacrylates and Their NMR Spectra or Heat of Formation," International Journal of Molecular Sciences, 13, 5789-5800, 2012, (12 pages).

"Silicone Rubber,COR Manufacturing, " retrieved from 'https://cormanufacturing.com/compounds-and-materials/silicone/' retrieved on Aug. 28, 2024, (5 pages).

"Silicone rubber," Wikipedia, The Free Encyclopedia, retrieved from 'https://en.wikipedia.org/wiki/Silicone_rubber,' retrieved on Aug. 28, 2024, (8 pages).

"Silicone Rubber: Fluoro Liquid Silicone Rubber (FLSR)," retrieved from 'https://www.dow.com/en-us/product-technology/pt-elastomers-rubber/pg-elastomers-lsr/elastomers-fluoro-lsr.html' retrieved on Aug. 19, 2024, (5 pages).

"What is a Form-in-Place Gasket?" Modus Idea to Ignition, retrieved from 'https://www.modusadvanced.com/resources/blog/what-is-a-form-in-place-gasket' retrieved on Aug. 28, 2024, (8 pages).

Yao et al., Unpublished Utility U.S. Appl. No. 18/883,769, filed Sep. 12, 2024.

\* cited by examiner

CRASH STOP THAT INCLUDES SILICONE RUBBER FOR A DATA STORAGE DEVICE, AND RELATED ARTICLES, SYSTEMS, AND METHODS

BACKGROUND

The present disclosure relates to crash stops in data storage devices like hard disk drives (HDDs). There is a continuing need for improved shock-absorbing members of crash stops within data storage devices that use electrical power to store and retrieve data. This disclosure relates to improved crash stops for use with electronic storage devices such hard disk drives.

SUMMARY

The present disclosure includes embodiments of a data storage device that has a housing with a base and a cover mounted to the base. The data storage device also includes a head-stack assembly rotatably mounted to the base. The head-stack assembly includes one or more radially-extending arms rotatable about an axis. The data storage device also includes at least one crash stop disposed within the housing. At least a portion of the crash stop includes an outer region having at least one cured, silicone rubber. The cured, silicone rubber does not include non-oxygen heteroatoms and non-silicon heteroatoms. The crash stop is positioned in the housing so that at least one of the one or more radially extending arms contact at least a portion of the outer region of the at least one crash stop if the one or more radially extending arms rotate to a pre-determined limit.

The present disclosure also includes embodiments of a data storage device having a housing with a base and a cover mounted to the base. The data storage device also includes a head-stack assembly rotatably mounted to the base. The head-stack assembly includes one or more radially-extending arms rotatable about an axis. The data storage device also includes at least one crash stop disposed within the housing. At least a portion of the crash stop includes an outer region having at least one cured, silicone rubber. The cured, silicone rubber does not include double covalent bonds, and does not include triple covalent bonds. The crash stop is positioned in the housing so that at least one of the one or more radially extending arms contact at least a portion of the outer region of the at least one crash stop if the one or more radially extending arms rotate to a pre-determined limit.

The present disclosure also includes embodiments of a method of making a shock-absorbing member of a crash stop. The method includes molding at least one silicone rubber precursor into a shock-absorbing member adapted to be disposed in a data storage device so that at least one radially extending arm of a head-stack assembly can contact at least a portion of the shock-absorbing member if the at least one radially extending arm rotates to a pre-determined limit. The method also includes curing the at least one silicone rubber precursor to form a cured, silicone rubber. The at least one cured, silicone rubber does not include non-oxygen heteroatoms and non-silicon heteroatoms.

BRIEF DESCRIPTION OF THE DRAWINGS

The discussion below makes reference to the following figures, wherein the same reference number may be used to identify the similar/same component in multiple figures. The schematic figures are for illustration purposes and are not necessarily drawn to scale.

DETAILED DESCRIPTION

Figure 1A:
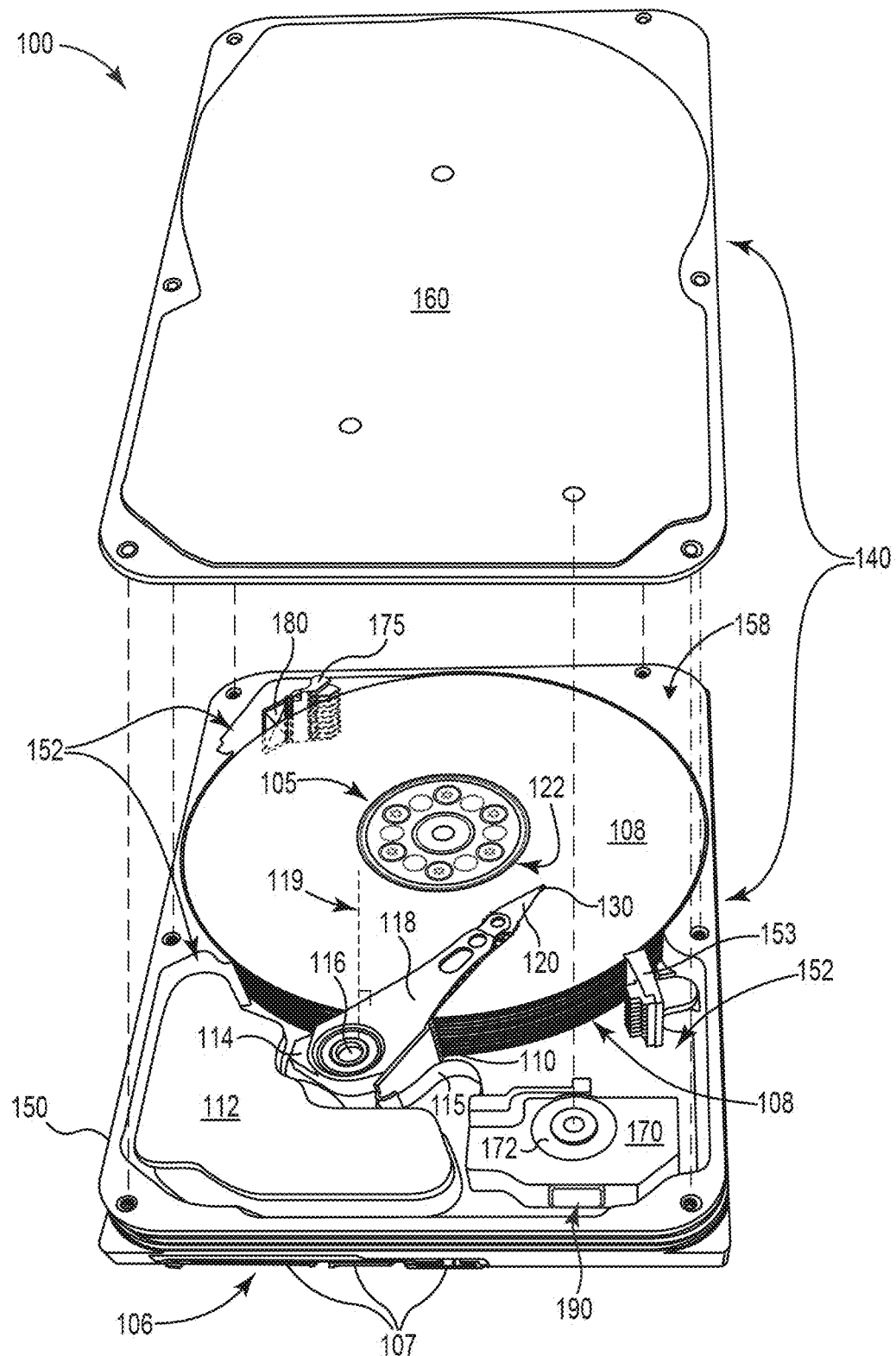
FIG. 1A is an exploded, perspective view of an example of a hard disk drive that may include one or more crash stops according to the present disclosure.

An example of a data storage device 100 that may include one or more crash stops according to the present disclosure will be described with respect to FIGS. 1A and 1B.

Data storage device 100 is illustrated as a hard-disk drive (HDD) that includes an outer enclosure or housing 140 configured to contain multiple hard-disk drive components, including electronic components. Housing 140 includes a base 150 and a cover 160 mounted to the base 150. Base 150 includes a recess or cavity 152 configured to accommodate components of data storage device 100. Base 150 can also be referred to as a motor base assembly (MBA). Data storage device 100 further includes a printed circuit board assembly (PCBA) 106. PCBA 106 of this configuration is coupled to base 150 and includes a plurality of input/output connectors 107 that are each configured to provide an interface between one or more components of data storage device 100 and one or more host devices (e.g., a computer, a server, a consumer electronic device, or the like).

Base 150 and cover 160 may be formed from any suitable material, such as metal (e.g., aluminum), plastic, or other suitable material or combinations thereof. In some embodiments, base 150 includes multiple components, such as an outer frame and a bottom cover, that are coupled together (e.g., by screws, welding, or the like).

Figure 1B:
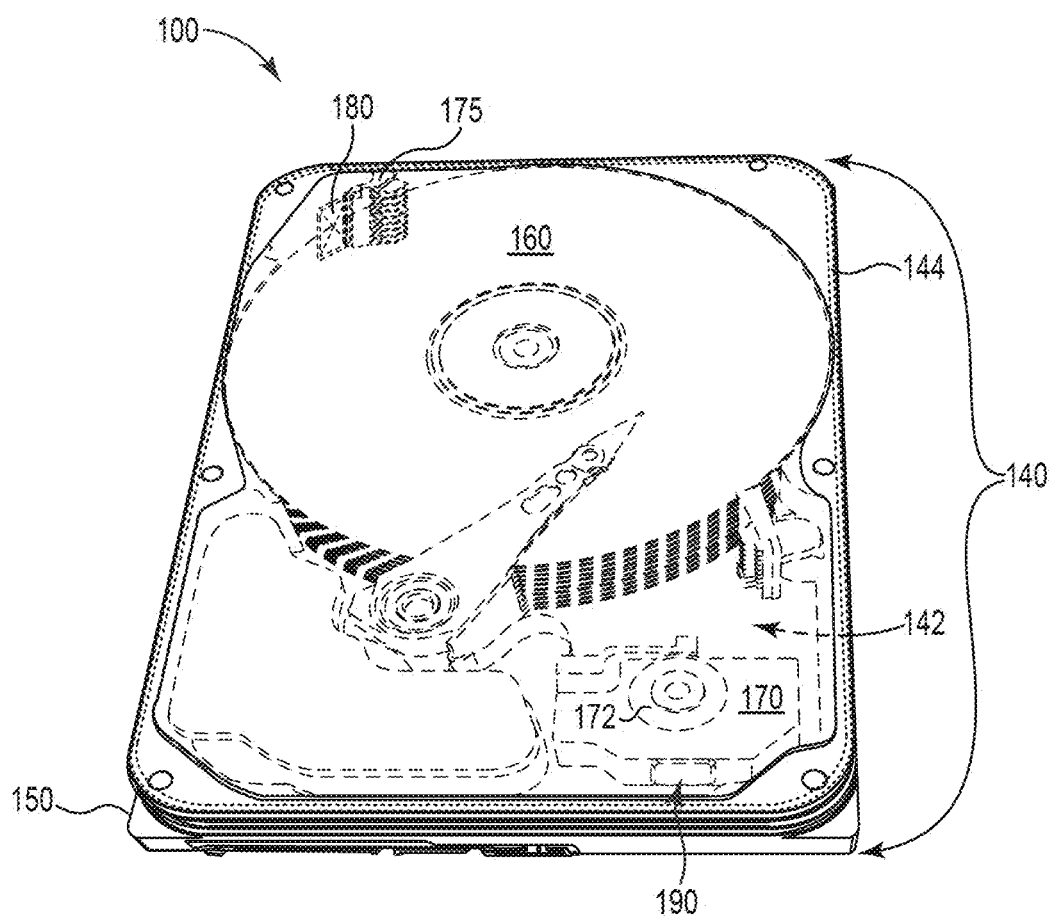
FIG. 1B is a perspective view of the hard disk drive shown in FIG. 1A in its assembled configuration and showing interior components in broken lines.

Cover 160 is configured to couple to base 150 to enclose components of data storage device 100, as shown in FIG. 1B. As shown, cover 160 is aligned with and coupled to a surface of base 150, such as a surface 158 shown in FIG. 1A, to define an interior volume 142 of data storage device 100, which includes an interior gas space. A load/unload ramp 153 is also positioned in interior volume 142. Components other than those illustrated or specifically identified in FIGS. 1A and 1B and described herein are contemplated as being positioned within the interior volume 142, such as a preamp and/or assembly hardware, for example. Cover 160 can be coupled to base 150 using any suitable technique, such as using one or more screws, connection fingers, locking/clipping structures, adhesives, rivets, other mechanical fasteners, welding (e.g., ultrasonic welding) or combinations thereof.

In some embodiments, data storage device 100 can further include one or more seals disposed between base 150 and top cover 160 and configured to seal the interior volume 142 of data storage device 100. In embodiments, seal 144 can be a weld formed between base 150 and cover 160, or seal 144 can be a form-in-place gasket (FIPG). The FIPG may be applied along an outer edge of top cover 160 and/or base 150 and thermally cured after coupling top cover 160 to base 150, for example. Other methods of sealing can additionally or alternatively be used to connect the base 150 to top cover 160.

A gas or gas mixture may be added to interior volume 142 of data storage device 100. Helium, for example, may be included in interior volume 142 to reduce mechanical vibrations, particularly of head gimbal assemblies (HGAs) of data storage device 100. Helium may also be included within data storage device 100 to enable lower head-media spacing (HMS) between a reader and/or writer of a magnetic recording head and a magnetic disk, and thus a higher areal density capability (ADC) of data storage device 100. As mentioned above, the interior gas space of the interior volume 142 may benefit from a small amount of oxygen. In some embodiments, interior gas space can have an oxygen concentration in the range from 0.1 to less than 20 mole percent, from 0.1 to 15 mole percent, or even from 3 to 15 mole percent based on the total gas in the interior gas space, with the balance being helium.

In some embodiments, data storage device 100 can be a hermetically sealed data storage device, which can be defined by, e.g., the amount of gas (e.g., helium) that leaks from the data storage device after it has been sealed (e.g., a welded HDD). In some embodiments, a hermetically sealed data storage device having its interior gas space filled with helium gas has a nominal helium leak rate of less than 10% by volume in five years. In some embodiments, in terms of (atm cc/second), a hermetically sealed data storage device having its interior gas space filled with helium gas has a nominal helium leak rate of $10 \times 10^{-8}$ atm (atmosphere) cc (cubic centimeter)/second or less at 25° C.; $8 \times 10^{-8}$ atm cc/second or less, $5 \times 10^{-8}$ atm cc/second or less; or even $4 \times 10^{-8}$ atm cc/second or less at 25° C.

Data storage device 100 includes an actuator 110, which includes a head stack assembly (HSA) 114 and voice coil motor 112. Head-stack assembly 114 is rotatably mounted to the base 150, and includes radially-extending arms 118 that are rotatable about an axis 119 that is perpendicular to the floor of base 150 as shown in FIG. 1A. Data storage device 100 includes one or more magnetic disks configured to store bits of data. HSA 114 further includes a plurality of head-gimbal assemblies (HGAs). Each HGA 120 includes a magnetic recording head 130 with a read head and a write head for reading data from and writing data to a surface of a magnetic disk 108. HSA 114 can include one or more subcomponents. Non-limiting examples of such subcomponents include hookup 115 (a flex cable and a flex clamp) and/or adhesives. Other components of a magnetic recording head 130 can be included, such as heaters, heat sinks, and piezoelectric actuators, for example. For a heat-assisted magnetic recording (HAMR) HDD, a magnetic recording head 130 may include a light source such as a laser, a waveguide, and a near-field transducer (NFT) to heat and lower the coercivity of magnetic grains in a spot of focus on a magnetic disk 108.

Figure 2A:
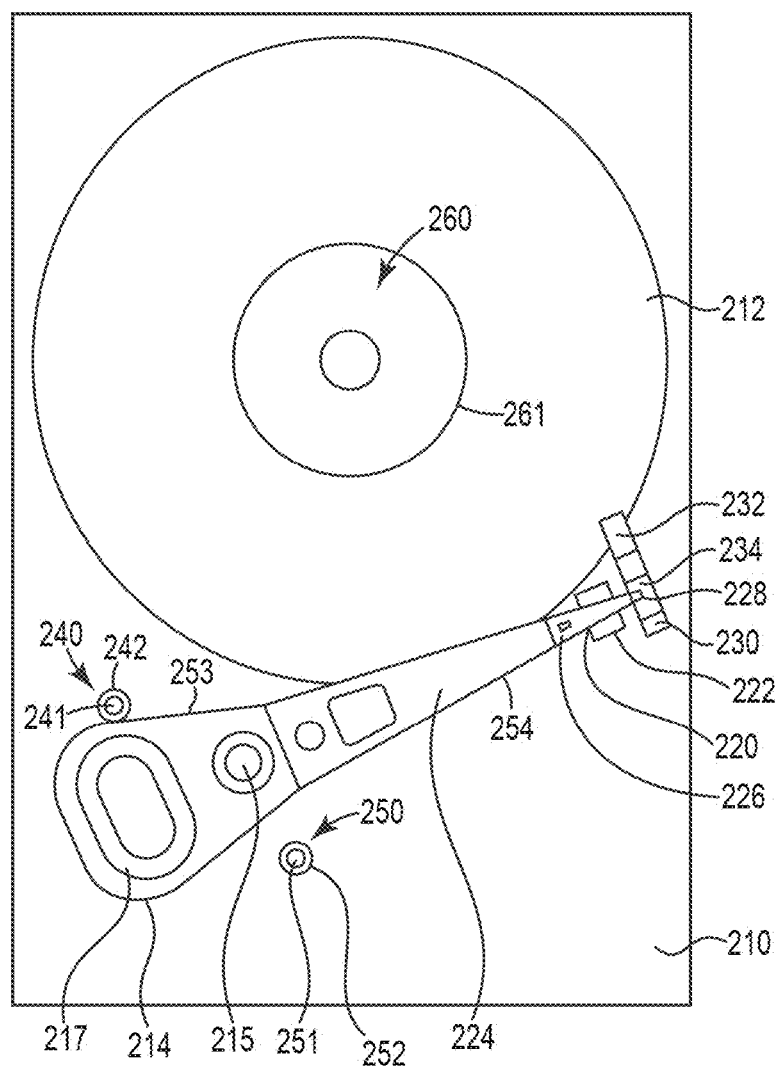
FIG. 2A is a schematic of a hard disk drive with its cover removed showing a radially extending arm of a head stack assembly in contact with an outer diameter crash stop.
Figure 2B:
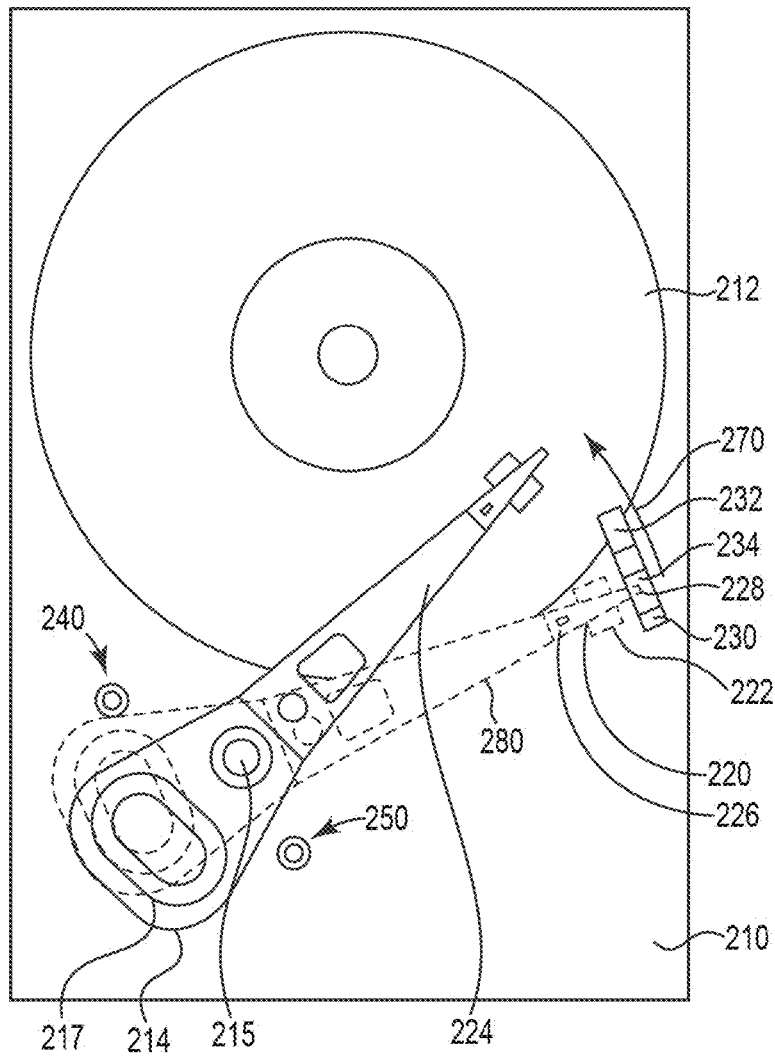
FIG. 2B is the schematic of the hard disk drive in FIG. 2A showing the radially extending arm of the head stack assembly rotating toward an inner diameter crash stop.
Figure 3A:
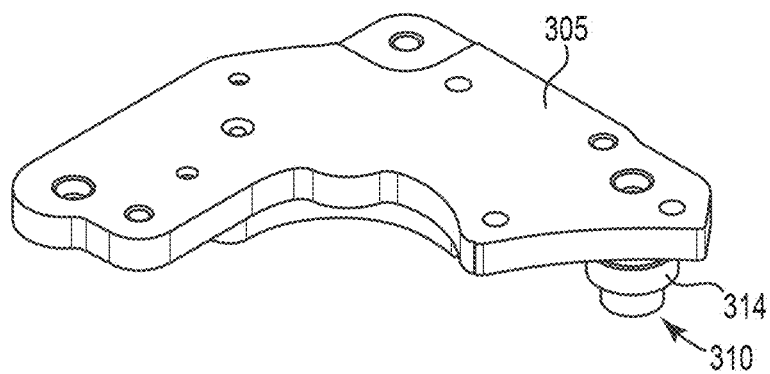
FIG. 3A is a perspective view of a top magnet in a voice coil motor that includes an ODCS.
Figure 3B:
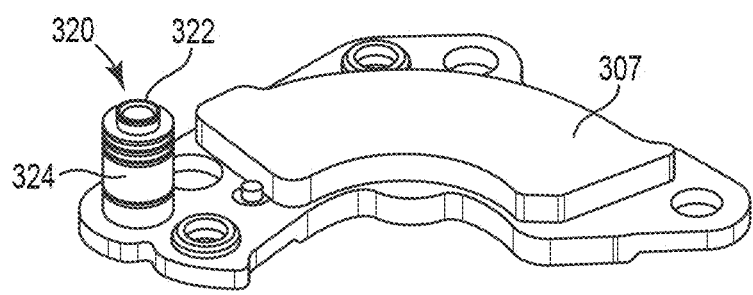
FIG. 3B is a perspective view of a bottom magnet in a voice coil motor that includes an IDCS.

Voice coil motor 112 produces a magnetic field that exerts a force on HSA 114, causing radially-extending arms to rotate about a shaft 116 in either rotational direction. Each radially-extending arm 118 is mechanically and rotatably coupled to shaft 116 such that as HSA 114 rotates it causes each radially-extending arm 118, and thus magnetic recording heads, to move relative to magnetic disks 108. Voice coil motor 112 includes magnets and a voice coil. An example of a voice coil is illustrated in FIGS. 2A and 2B, and an example of magnets is illustrated in FIGS. 3A and 3B and below.

Data storage device 100 further includes a motor assembly 105 configured to rotatably support magnetic disks and circumferentially rotate magnetic disks about an axis of rotation during operation. Magnetic disks are mounted on motor assembly 105 such that an annular volume of each magnetic disk 108 encircles a portion of motor assembly 105. Further, magnetic disks are separated from each other in a stacked manner using spacers, which is illustrated in the exploded view of FIG. 4. Motor assembly 105 has an outside diameter 122 and may rotate magnetic disks during an operation of data storage device 100 such that each magnetic disk 108 moves relative to a respective magnetic recording head 130 to enable the magnetic recording heads to read data from and/or write data to the magnetic disk 108.

Data storage device 100 includes a diverter 175 that is proximal to magnetic disks 108. Diverter 175 is configured to divert helium and/or other interior gas mixtures(s) to reduce windage on each radially-extending arm 118, which can reduce undesired vibrations that may cause a magnetic recording head 130 to move off track and/or contact a magnetic disk 108.

The illustrated data storage device 100 includes components having an adsorbent composition in the form an article that permits the components to be positioned and/or mounted in the interior volume 142 of data storage device 100 so that the adsorbent composition can adsorb moisture and/or organic vapors from the interior gas. In some embodiments, a component can also include filtering capability to remove organic particulate material. As shown in FIGS. 1A and 1B, non-limiting examples of such components include an environmental control module 170, a recirculation filter 180, and a label filter 190 for such a purpose. As shown, environmental control module 170 includes an inlet diffuser seal 172 helps its contents (e.g., environmental control module tablet (not shown)) dry during manufacturing. The environmental control module tablet can become exposed to the interior volume 142 of data storage device 100 by breaking the seal located at the bottom center of inlet diffuser seal 172 to create an opening (not shown) so that gas exchange can occur between the inside of environmental control module 170 and the interior volume 142.

An example of crash stops that can be used in a data storage device 100 will now be illustrated with respect to FIGS. 2A and 2B. FIG. 2A shows a base 210 of a hard disk drive with its cover removed showing a radially extending arm of a head-stack assembly 214 in contact with an outer diameter crash stop 240 (ODCS).

For ease of illustration and explanation, the data storage device depicted in FIGS. 2A and 2B is shown as having a single recording head and associated disk surface, although it could have multiple heads and disks. The data storage device includes base 210 to which are secured a disk drive or spindle motor with attached magnetic disk 212, a head-stack assembly 214, and a load/unload ramp 230. The base 210 and cover (not shown) provide a substantially sealed housing for the disk drive.

The head-stack assembly 214 rotates on a pivot 215 (or bearing assembly) mounted to base 210. Head-stack assembly 214 includes radially-extending arm 224 having a radially extending side 253 and a radially-extending side 254. Head-stack assembly 214 can be actuated using a rotary voice coil motor (VCM) that includes coil 217 and a fixed magnetic field of a magnet assembly (not shown, see, e.g., FIGS. 3A and 3B) mounted to base 210. The data storage device in FIGS. 2A and 2B include crash stops 240 and 250, where each crash stop is positioned in the housing so that radially-extending arm 224 contacts at least a portion of the outer region of each crash stop 240 and 250 if the radially-extending arm 224 rotates to a pre-determined limit. The pre-determined limit corresponds to the desired position of each crash stop, which is illustrated below.

As shown, crash stop 240 is an outside diameter crash stop (ODCS) and crash stop 250 is an inside diameter crash stop (IDCS), which are mounted to base 210 to limit the travel of head-stack assembly 214. Alternatively, crash stop 240 and/or crash stop 250 can be mounted to other features in the hard disk drive such as one or more magnets as shown in FIGS. 3A and 3B. As shown, crash stop 240 includes a post 241 that is attached to base 210. Likewise, as shown, crash stop 250 includes a post 251 that is attached to base 210. For example, post 241 and/or post 251 can be a separate component mounted to base 210 or can be integrally formed with base 210. Post 241 and post 251 can be made out of rigid material such as metal and/or plastic. As shown, crash stop 240 also includes a shock-absorbing member 242 mounted over the post 241. As shown, shock-absorbing member 242 is a hollow cylindrical body (e.g., O-ring) that surrounds a vertical portion of the post 241. Likewise, crash stop 250 also includes a shock-absorbing member 252 mounted over the post 251. As shown, shock-absorbing member 252 is a hollow cylindrical body (e.g., O-ring) that surrounds a vertical portion of the post 251. A shock-absorbing member can be attached to a post via a friction fit and/or using an adhesive.

The HSA 214 has a head-gimbal assembly 226 (HGA) attached to one end of radially-extending arm 224 that is opposite to the end having voice coil 217. The head-gimbal assembly 226 supports the head carrier or air-bearing slider 222 and includes a tab 228 that extends to the air-bearing slider 222. A read/write head or transducer 220 is formed on the trailing end of slider 222.

A load/unload ramp 230 having a ramp portion 232 and a recess 234 is mounted to the base 210. Load/unload ramp 230 supports the tab 228 in its recess 234 and thus serves as the parking location for HSA 214 when the disk drive is not operating. FIG. 2A illustrates the HSA 214 "parked" meaning that tab 228 resides in ramp recess 234 and the HSA 214 is forced against shock-absorbing member 242 of crash stop 240 (ODCS). The crash stop 240 prevents the slider 222 of the HGA 226 from dropping off the backside of the load/unload ramp 230 as the slider 222 is unloaded away from magnetic disk 212. When the HSA 214 is unloaded to the load/unload ramp 230, a portion of the radially extending side 253 of radially-extending arm 224 will contact the shock-absorbing member 242 of crash stop 240 such that the slider 222 is parked onto the right location on load/unload ramp 230.

During read/write operations of the disk drive, the drive motor rotates the magnetic disk 212, and the HSA 214 rotates about pivot 215 to move the slider 222 generally radially across the surface of the magnetic disk 212 so that the read/write transducer 220 may access different data tracks on the magnetic disk 212.

The HGA 226 provides a loading force to the slider 222 to urge it toward the surface of magnetic disk 212. The data detected from magnetic disk 212 by the transducer 220 is processed into a data readback signal by signal amplification and processing circuitry (not shown). When the disk drive is powered down, the HSA 214 is driven toward load/unload ramp 230. The tab 228 contacts the ramp portion 232, moves up the ramp portion 232 and away from magnetic disk 212, and comes to rest in ramp recess 234. At this time, the HSA 214 is a "parked" position 280 (represented by dashed outline in FIG. 2B) and pressed against shock-absorbing member 242 of crash stop 240. Shock-absorbing member 242 is designed to cushion impacts as the HSA 214 reaches the end of its allowed travel in the OD direction.

FIG. 2B is the schematic of the hard disk drive in FIG. 2A showing the radially-extending arm 224 of HSA 214 rotating toward crash stop 250.

The crash stop 250 is installed to prevent the slider 222 of the HSA 214 from contacting the outside diameter 261 of motor assembly 260 (or outside diameter 406 of spacers 404 shown in FIG. 4) when the sliders 222 of HSA 214 travel from parked position 280 toward to the inside diameter of magnetic disk 212 as indicated by arrow 270.

Shock-absorbing members 242 and 252 can be made of a cured, silicone rubber according to the present disclosure.

FIGS. 3A and 3B show top and bottom magnets that form the magnet assembly of a voice coil motor like voice coil motor 112 in FIG. 1A. FIG. 3A shows a top magnet 305 having a crash stop 310 attached to the bottom of the magnet instead of the base of housing like in FIG. 2A. Crash stop 310 functions as an ODCS like crash stop 240 in FIG. 2A, and includes a shock-absorbing member 314 in the form of a hollow cylindrical body that surrounds a vertical portion of a post (not shown) attached to the bottom of top magnet 305.

FIG. 3B shows a bottom magnet 307 having a crash stop 320 attached to the top of the magnet instead of the base of housing like in FIG. 2A. Crash stop 320 functions as an IDCS like crash stop 250 in FIG. 2A, and includes a shock-absorbing member 324 in the form of a hollow cylindrical body that surrounds a vertical portion of a post 322 attached to the top of bottom magnet 307. Bottom magnet 307 and top magnet 305 are physically assembled together to form a voice coil motor that has a space between the bottom magnet 307 and the top magnet 305 to permit a voice coil like voice coil 217 to be freely and rotatably positioned therebetween to permit a corresponding HSA to rotate as described above under the influence of a magnetic field.

Shock-absorbing members 314 and 324 can be made of a cured, silicone rubber according to the present disclosure.

Figure 4:
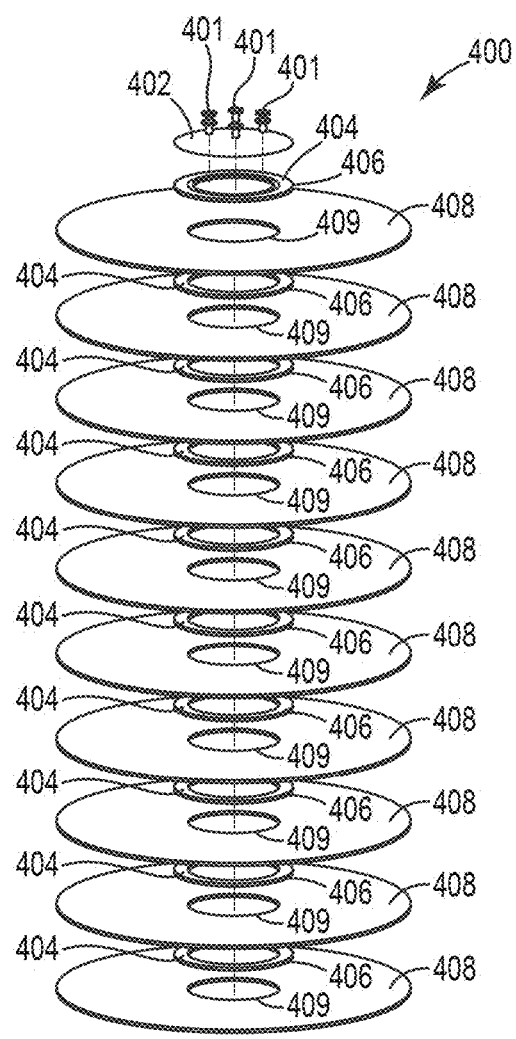
FIG. 4 is an exploded view of a platter of magnetic disks separated by spacers.

FIG. 4 is an exploded view of a platter 400 of magnetic disks 408 separated by spacers 404. As shown in in FIG. 4, each magnetic disk 408 is separated by a spacer 404 having on outside diameter 406. Each magnetic disk 408 also has an inside diameter 409. The platter 400 of magnetic disks are mounted to a motor assembly like motor assembly 260 in FIG. 2A. A cover 402 and fasteners 401 can be used to physically secure the platter 400 to a motor assembly (not shown). As described above in FIGS. 2A and 2B, an IDCS such as crash stop 250 is positioned in an HDD with respect to an HSA to prevent a slider from contacting the outside diameters 406 of spacers 404.

According to one aspect of the present disclosure, at least a portion of an outer region (e.g., a shock-absorbing member) of a crash stop is formulated to include at least one cured, silicone rubber and provide one or more advantages as described herein. Formulating an outer region of a crash stop with a silicone rubber can avoid the presence of triphenylphosphine oxide (TPPO), if desired, which can cause HDD reliability issues, especially sealed HDDs. TPPO is a reactive contaminant for HDDs, and can cause HDD reliability issues. TPPO can be present when using Fluorine Kautschuk Material (FKM). TPPO can occur as a result of FKM polymerization. TPPO can also be present when using certain materials on crash stop such as anti-stiction coatings. For example, some anti-stiction coatings that may be applied to the outer surface of crash stop have ingredients that can react with additives in rubbers to form TPPO. Advantageously, silicone rubbers according to the present disclosure can have relatively low surface energy, thereby providing desirable inherent anti-stiction properties such that anti-stiction coatings can be avoided if desired.

There is a tendency to be cautious when using silicone materials in HDDs because of the negative impact outgassing and volatile siloxanes can have on HDD performance.

But the present disclosure identifies silicone rubbers that can advantageously allow crash stops to be formed by compression molding or injection molding, while having low outgassing and excellent shock-absorbing and anti-stiction properties at the same time. Avoiding undue outgassing is especially advantageous in the context of sealed HDDs. Further, the selected silicon-based organic compounds can undergo post-baking at relatively high temperatures to help remove any residual volatile siloxanes, which helps provide low outgassing.

A "silicone rubber" refers to an elastomer that is cured or uncured. A silicone rubber includes silicone, which is a polymer, that includes silicon, carbon, hydrogen, and oxygen. An "uncured, silicone rubber" refers to a silicone rubber that has not been exposed to curing conditions yet. In the uncured state, silicone rubber behaves as an adhesive gel or liquid, which can be converted to a solid via curing that includes vulcanization. A "cured, silicone rubber" refers to an uncured, silicone rubber that has been exposed to curing conditions to at least partially (e.g., substantially fully) cure the uncured, silicone rubber.

As mentioned above, a silicone rubber can be selected according to the present disclosure so that it cause undue drive reliability issues in HDDs by, e.g., depositing on a head-disk interface. For example, a silicone rubber can be selected so that it does not have undue volatility (relatively low outgassing) and/or reactivity. A silicone rubber can also be selected to provide desirable elastomeric properties (e.g., shock adsorbing properties for an IDCS and/or ODCS) at operating temperatures, especially at relatively low operating temperatures (e.g., 10° C. or less, or even 0° C. or less). A rubber can also be selected based on its ability to be molded (e.g., compression molded or injection molded) into a shock-absorbing member or coated onto a post of crash stop. Further, a silicone rubber can be selected so that it can be exposed to elevated temperatures ("baking) to remove volatile siloxanes that may be present in the cured, silicone rubber prior to permanently sealing an HDD cover to the base. Advantageously, a silicone rubber can be selected so that it can be exposed to such elevated temperatures.

In some embodiments, a silicone rubber can be selected according to the present disclosure so that the corresponding cured, silicone rubber does not include non-oxygen heteroatoms and non-silicon heteroatoms. Non-oxygen heteroatoms and non-silicon heteroatoms include nitrogen, sulfur, phosphorus, and combinations thereof. In some embodiments, a silicone rubber can be selected according to the present disclosure so that the corresponding cured, silicone rubber does not include non-oxygen heteroatoms, non-silicon heteroatoms, and non-fluorine atoms. In some embodiments, a silicone rubber can be selected according to the present disclosure so that the corresponding cured, silicone rubber does not include double covalent bonds and/or does not include triple covalent bonds. In some embodiments, a silicone rubber can be selected according to the present disclosure so that the corresponding cured, silicone rubber does not include reactive functional groups such as a functional group chosen from —OH, —CH═O, —COOH, and combinations thereof. Such reactive functional groups tend to impact the proper functioning of an HDD to an undue degree.

In some embodiments, a silicone rubber according to the present disclosure has a repeating unit —$R_2SiO$—, where each R is independently hydrogen or an alkyl group.

Non-limiting examples of silicone rubbers according to the present disclosure that can be used to form at least a portion of an outer region (e.g., a shock-absorbing member) of a crash stop include high-temperature vulcanizing silicone rubber (high-temperature vulcanized (HTV) silicone rubber in its cured form), room-temperature vulcanizing silicone rubber (room-temperature vulcanized (RTV) silicone rubber in its cured form), liquid silicone rubber (LSR) (vulcanized LSR in its cured form), and combinations thereof.

HTV silicone rubber includes polymers with a high molecular weight. HTV silicone rubbers are available in an uncured form and can be handled using traditional rubber processing techniques. High-temperature vulcanizing silicone rubbers are higher-viscosity rubbers that are cured at elevated temperatures (heat) by means of organic peroxides or with a platinum catalyst. High-temperature vulcanizing silicone rubber can be desirable for use with compression molding.

RTV silicone rubber is a type of silicone rubber made from one-part (RTV-1) or two-component (RTV-2) systems. RTV-1 silicone rubber refers to one-component room-temperature vulcanized silicone rubber while RTV-2 silicone rubber two-component room-temperature vulcanized silicone rubber. Room-temperature vulcanizing silicone rubber hardens at room temperature to a soft or medium hardness.

LSR has the smallest molecular chains as compared to RTV silicone rubber and HTV silicone rubber. LSR can be extruded or injection molded.

Non-limiting examples of silicone rubbers according to the present disclosure that can be used to form at least a portion of an outer region (e.g., a shock-absorbing member) of a crash stop can also be described as one or more dialkyl silicone rubbers, vinylmethyl silicone rubber, phenylmethyl silicone rubber, phenylvinylmethyl silicone rubber, one or more fluoro silicone rubbers, and combinations thereof. In some embodiments, such silicone rubbers can include MQ silicone rubber, PMQ silicone rubber, VMQ silicone rubber, PVMQ silicone rubber, FVMQ silicone rubber, and combinations thereof, according to ASTM D1418. MQ silicone rubber includes methyl functional group and refers to dimethylsilicone (methyl silicone) rubber. PMQ silicone rubber includes methyl and phenyl functional groups and refers to methylphenylsilicone (phenylsilicone) rubber, which can have desirable low-temperature performance. VMQ silicone rubber includes methyl and vinyl functional groups and refers to methylvinylsilicone rubber. PVMQ silicone rubber includes methyl, phenyl, and vinyl functional groups. FVMQ refers to fluorinated silicone rubber.

As mentioned above, in some embodiments, the cured, silicone rubber does not include double covalent bonds and/or does not include triple covalent bonds. If one or more silicone rubbers are selected such that phenyl groups and/or vinyl groups are present in cured, silicone rubber, those cured, silicone rubbers are present in an amount of 20% or less, 15% or less, 10% or less, or even 5% or less, by total weight (or moles, whichever is higher) of all of the cured, silicone rubbers in the outer region (e.g., a shock-absorbing member) of a crash stop.

A majority of the shock-absorbing member or outer coating of a crash stop is made from the one or more silicone rubbers according to present disclosure. In some embodiments the shock-absorbing member or outer coating of a crash stop includes one or more silicone rubbers in an amount from 80 to 99.9% by total weight, or even from 85 to 99.9% by total weight.

One or more additives can be present the at least one cured, silicone rubber of a shock-absorbing member or outer coating of a crash stop. In some embodiments the shock-absorbing member or outer coating of a crash stop includes one or more additives in an amount from 0.1 to 20% by total weight, or even from 0.1 to 15% by total weight. Non-limiting examples that can be combined with a silicone rubber include crosslinkers, fillers, stabilizers, flame retardants, pigments, colors, catalysts, and the like. Examples of crosslinkers for curing silicone rubber include peroxide crosslinkers (e.g., benzoyl peroxide, 2,4-dichlorobenzoyl peroxide, t-butyl perbenzoate, and dicumyl peroxide). An example of catalysts for curing silicone rubber include platinum catalysts.

A method of making a crash stop having an outer region with a cured, silicone rubber according to the present disclosure can be made a variety of ways depending on the form of the cured, silicone rubber. For illustration purposes, a method of making a shock-absorbing member like shock-absorbing members 242, 252, 324, and/or 324 will be described.

One or more silicone rubber precursors (uncured silicone rubbers) can be selected as described above to form a shock-absorbing member. The one or more silicone rubber precursors can be molded into the form of a shock-absorbing member using any suitable molding technique such as injection molding, compression molding, extrusion, and the like. Optionally, one or more additives described herein can be combined with the one or more silicone rubber precursors. As described above, the shock-absorbing member is adapted to be disposed in a data storage device so that at least one radially extending arm of a head-stack assembly can contact at least a portion of the shock-absorbing member if the at least one radially extending arm rotates to a pre-determined limit.

Curing a rubber refers to a process of crosslinking polymer chains to enhance properties, e.g., mechanical properties, of the cured, silicone rubber. The curing process forms strong chemical bonds between the chains, which strengthens and stabilizes the cured, silicone rubber. A variety of curing methods can be used to cure a silicone rubber. The choice of curing method depends on the specific silicone rubber, and desired properties. Curing a silicone rubber can include platinum-based curing, condensation curing, peroxide curing, and combinations thereof.

Platinum-based curing (also called addition curing) involves a hydride and a vinyl functional siloxane polymer reacting in the presence of a platinum catalyst, thereby forming an ethyl bridge between the two. Platinum-based curing tends to be relatively quick, although the curing rate can be slowed down by the presence of tin, sulfur, and a variety of amine compounds.

Condensation curing involves either one-part or two-part curing systems. In a one-part curing system (e.g., one-component room-temperature vulcanized (RTV-1) silicone rubber), a cross-linker is exposed to ambient humidity and hydrolyzes to create a hydroxyl or silanol group. The silanol group can condense further with another hydrolyzable group on the polymer or cross-linker and continue until fully cured. Such a system can cure on its own at room temperature.

Crosslinkers used in condensation cure systems include alkoxy, acetoxy, ester, enoxy or oxime silanes such as methyl trimethoxy silane for alkoxy-curing systems and methyl triacetoxysilane for acetoxy-curing systems. In some embodiments, an additional condensation catalyst is added to fully cure the silicone rubber and achieve a tack-free surface. Organotitanate catalysts such as tetraalkoxy titanates or chelated titanates can be used in alkoxy-cured systems. Tin catalysts such as dibutyl tin dilaurate can be used in oxime and acetoxy-cured systems. Depending on the type of detached molecule, silicone rubber cure systems can be classified as acidic, neutral, or alkaline.

Two-part condensation systems (e.g., two-component room-temperature vulcanized (RTV-2) silicone rubber) package a cross-linker and condensation catalyst together in one part while the polymer and any fillers or pigments are in the second part. Mixing the two parts together causes curing to take place.

Peroxide curing is a free radical curing process that uses organic peroxide at elevated temperature for curing. Peroxide curing involves chemically crosslinking different polymer chains to form a resilient, three-dimensional lattice. As mentioned above, examples of peroxide crosslinkers include benzoyl peroxide, 2,4-dichlorobenzoyl peroxide, t-butyl perbenzoate, and dicumyl peroxide. Curing with peroxides can produce byproducts. However, these products can be treated in a post-cure oven which greatly reduces the peroxide breakdown product content.

If desired, release agents can be avoided with one or more cured, silicone rubbers that have non-stick properties.

Curing a silicone rubber precursor includes vulcanization. In some embodiments, vulcanization includes prolonged exposure to air. In some embodiments, curing can include exposing the silicone rubber precursors to a temperature from 120° C. to 200° C. in the presence of a platinum catalyst or an organic peroxide. For example, when using a platinum catalyst or an organic peroxide, silicone rubber precursor (e.g., HTV or LSR) can be cured at a temperature from 120° C. to 200° C. In some embodiments, exposure to an elevated temperature can then be followed by vulcanization.

In addition to curing uncured, silicone rubber, exposing the cured, silicone rubber to an elevated temperature ("baking") can remove one or more contaminants such as residual volatile siloxanes while still maintaining the integrity and shape of the shock-absorbing member. In some embodiments, baking conditions include exposing the mixture to a temperature of at least 150° C., at least 200° C., at least 250° C., or even at least 300° C. In some embodiments, baking conditions include exposing the article to a temperature from 150° C. to 350° C., or from 200° C. to 300° C. In some embodiments, baking conditions include exposing the article to a temperature just described for a time period of at least 30 minutes, at least 60 minutes, or even at least 120 minutes. In some embodiments, baking conditions include exposing the article to a temperature just described for a time period from 30 minutes to 48 hours, from 1 to 48 hours, from 2 to 48 hours, or even from 2 to 24 hours.

Heating for curing and/or baking can be performed using an oven, such as a convection oven.

Figure 5:
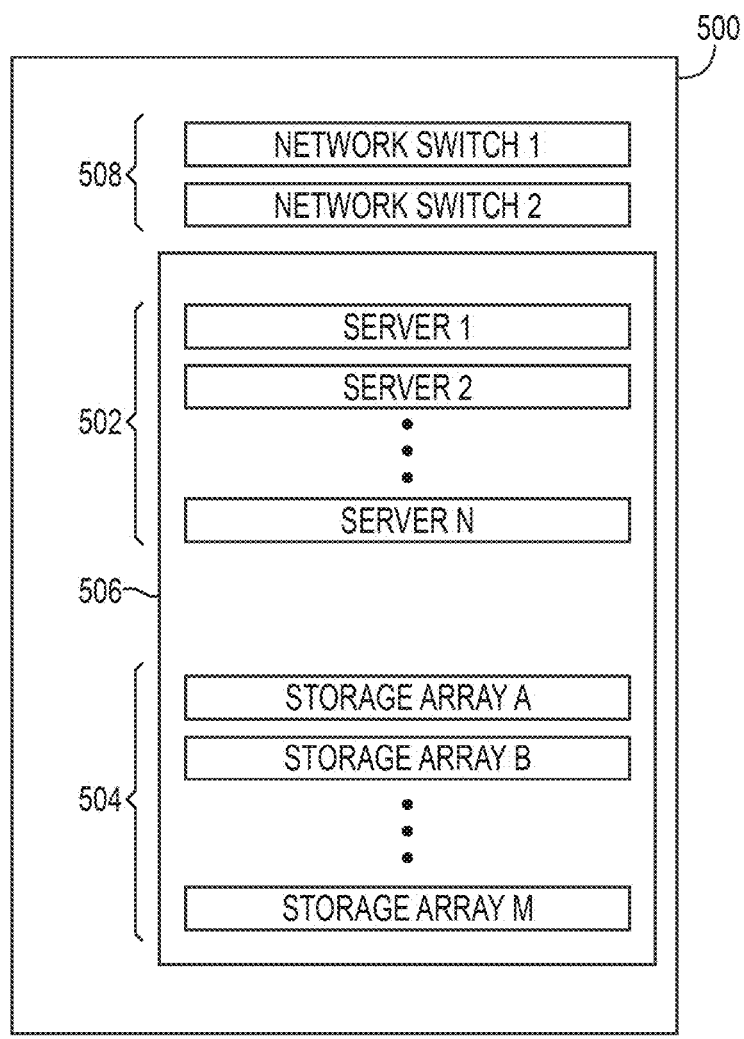
FIG. 5 is a block diagram of a data center system including a plurality of data storge devices according to the present disclosure.

FIG. 5 illustrates a non-limiting example of a computing system 500 that includes a plurality of data storge devices (e.g., data storage device 100) that include an absorbent composition according to the present disclosure. In FIG. 5, a diagram shows a computing system 500 that can have a computing enclosure used in network storage services. As shown, the computing enclosure includes a plurality of servers 502 coupled to a plurality of drive arrays 504 via a rack-level network fabric 506. Each server 502 can include at least one CPU coupled to random access memory (RAM) and an input/output (IO) subsystem. Each server 502 may have one or more dedicated power supplies (not shown) or the enclosure may provide power through a power bus (not shown). Each server 502 may also have an IO interface for connecting to the rack-level network fabric 506. The rack-level network fabric 506 may use other rack-level networking technology such as switches 508.

The drive arrays 504 may each include a separate sub-enclosure with IO busses, power supplies, storage controllers, etc. The drive arrays 504 include a plurality of individual data storage devices (e.g., HDD) densely packed into the sub-enclosure. An example of a data center that includes a computing system have a plurality of data storage devices is also described in U.S. Pat. No. 11,567,834 (Bent et al.).

What is claimed is:

1. A data storage device comprising:
    a housing comprising:
        a base; and
        a cover mounted to the base;
    a head-stack assembly rotatably mounted to the base, wherein the head-stack assembly comprises one or more radially-extending arms rotatable about an axis; and
    at least one crash stop disposed within the housing, wherein at least a portion of the at least one crash stop comprises an outer region comprising at least one cured, silicone rubber, wherein the at least one cured, silicone rubber does not include non-oxygen heteroatoms and non-silicon heteroatoms, and wherein the at least one crash stop is positioned in the housing so that at least one of the one or more radially-extending arms contact at least a portion of the outer region of the at least one crash stop if the one or more radially-extending arms rotate to a pre-determined limit.

2. The data storage device of claim 1, wherein the non-oxygen heteroatoms and non-silicon heteroatoms are chosen from nitrogen, sulfur, phosphorus, and combinations thereof.

3. The data storage device of claim 1, wherein the at least one cured, silicone rubber does not include double covalent bonds, and wherein the at least one cured, silicone rubber does not include triple covalent bonds.

4. The data storage device of claim 1, wherein the at least one cured, silicone rubber does not include a functional group chosen from —OH, —CH—O, —COOH, and combinations thereof.

5. The data storage device of claim 1, wherein the at least one cured, silicone rubber is chosen from high-temperature vulcanized (HTV) silicone rubber, room-temperature vulcanized (RTV) silicone rubber, vulcanized liquid silicone rubber (LSR), and combinations thereof.

6. The data storage device of claim 1, wherein the at least one cured, silicone rubber is chosen from high-temperature vulcanized (HTV) silicone rubber, one-component room-temperature vulcanized (RTV-1) silicone rubber, two-component room-temperature vulcanized (RTV-2) silicone rubber, and combinations thereof.

7. The data storage device of claim 1, wherein the at least one cured, silicone rubber is chosen from one or more dialkyl silicone rubbers, vinylmethyl silicone rubber, phenylmethyl silicone rubber, phenylvinylmethyl silicone rubber, one or more fluoro silicone rubbers, and combinations thereof.

8. The data storage device of claim 7, wherein the at least one cured, silicone rubber comprises two or more cured, silicone rubbers, wherein at least one of the two or more cured, silicone rubbers comprises a functional group chosen from phenyl, vinyl, and combinations thereof, wherein the at least one of the two or more cured, silicone rubbers is present in an amount of 20% or less by total weight of the two or more cured, silicone rubbers.

9. The data storage device of claim 1, wherein the at least one cured, silicone rubber is chosen from at least one silicone rubber having a repeating unit —$R_2SiO$—, wherein each R is independently hydrogen or an alkyl group.

10. The data storage device of claim 1, wherein the at least one cured, silicone rubber is chosen from MQ silicone rubber, PMQ silicone rubber, VMQ silicone rubber, PVMQ silicone rubber, FVMQ silicone rubber, and combinations thereof, according to ASTM D1418.

11. The data storage device of claim 1, wherein the at least one cured, silicone rubber comprises one or more additives present in an amount of 20% or less by total weight of the at least one cured, silicone rubber.

12. The data storage device of claim 1, wherein the at least one crash stop comprises:
    a post mounted to a portion of the data storage device; and
    a shock-absorbing member mounted to the post, wherein the shock-absorbing member comprises the at least one cured, silicone rubber, and wherein the shock-absorbing member comprises the outer region that the at least one of the one or more radially-extending arms can contact if the one or more radially-extending arms rotate to a pre-determined limit.

13. The data storage device of claim 12, wherein the shock-absorbing member comprises at least a hollow cylindrical body that surrounds a vertical portion of the post.

14. A computing system comprising a plurality of data storge devices according to claim 1.

15. A data storage device comprising:
    a housing comprising:
        a base; and
        a cover mounted to the base;
    a head-stack assembly rotatably mounted to the base, wherein the head-stack assembly comprises one or more radially-extending arms rotatable about an axis; and
    at least one crash stop disposed within the housing, wherein at least a portion of the at least one crash stop comprises an outer region comprising at least one cured, silicone rubber, wherein the at least one cured, silicone rubber does not include double covalent bonds, wherein the at least one cured, silicone rubber does not include triple covalent bonds, and wherein the at least one crash stop is positioned in the housing so that at least one of the one or more radially-extending arms contact at least a portion of the outer region of the at least one crash stop if the one or more radially-extending arms rotate to a pre-determined limit.

* * * * *